United States Patent
Huda et al.

(10) Patent No.: US 12,451,017 B2
(45) Date of Patent: Oct. 21, 2025

(54) UNIVERSAL UNCREWED AERIAL VEHICLE (UAV) COLONY WIRELINE WIRELESS ORCHESTRATION AND AUTOMATION MANAGEMENT

(71) Applicant: AT&T Intellectual Property I, L.P., Atlanta, GA (US)

(72) Inventors: Eshrat Huda, Hillsborough, NJ (US); David H. Lu, Morganville, NJ (US); Moshiur Rahman, Marlboro, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 438 days.

(21) Appl. No.: 17/960,449

(22) Filed: Oct. 5, 2022

(65) Prior Publication Data

US 2024/0119845 A1    Apr. 11, 2024

(51) Int. Cl.
*G08G 5/30* (2025.01)
*B64C 39/02* (2023.01)

(52) U.S. Cl.
CPC ............. *G08G 5/30* (2025.01); *B64C 39/024* (2013.01); *B64U 2201/102* (2023.01)

(58) Field of Classification Search
CPC .. G08G 5/30; B64C 39/024; B64U 2201/102; H10D 62/13
See application file for complete search history.

(56) References Cited

U.S. PATENT DOCUMENTS

| | | | | |
|---|---|---|---|---|
| 9,990,854 B1 * | 6/2018 | Elmasry | | G08G 5/727 |
| 2016/0028471 A1 * | 1/2016 | Boss | | H04W 24/02 |
| | | | | 455/406 |
| 2017/0238234 A1 * | 8/2017 | Dowlatkhah | | H04W 48/16 |
| | | | | 455/517 |
| 2018/0035306 A1 * | 2/2018 | Zavesky | | H04B 7/18506 |
| 2021/0007042 A1 * | 1/2021 | Zhu | | H04W 60/06 |
| 2022/0189320 A1 * | 6/2022 | Melodia | | G01C 21/16 |

FOREIGN PATENT DOCUMENTS

WO    WO-2018205756 A1 * 11/2018

OTHER PUBLICATIONS

Qianqian Zhang et al., Predictive Deployment of UAV Base Stations in Wireless Networks: Machine Learning Meets Contract Theory, 2018, IEEE Transactions on Wireless Communications, 20(1), 637-652 (Year: 2018).*

* cited by examiner

*Primary Examiner* — Aniss Chad
*Assistant Examiner* — Nikki Marie M Molina
(74) *Attorney, Agent, or Firm* — Guntin & Gust, PLC; Louis Yang

(57) ABSTRACT

An automated system provides end-to-end (E2E) orchestration for machine learning (ML)-enabled and software-defined network (SDN)-enabled reactive and predictive (e.g., 5G) cell-on-drone (COD) dispatch and deployment. The system may be configured to detect or predict traffic surges (e.g., relative to typical or baseline levels) in a given cell site and orchestrate provisioning of resources, including COD deployment, to address the surge. COD deployment may involve one or more clusters or colonies of drones equipped with low-powered cellular radio access (or small cell) nodes, where each cluster includes (or is led by) one or more SDN-equipped drones that provide intelligent SDN-on-drone (SOD) functionality.

20 Claims, 7 Drawing Sheets

300

UNIVERSAL UNCREWED AERIAL VEHICLE (UAV) COLONY WIRELINE WIRELESS ORCHESTRATION AND AUTOMATION MANAGEMENT

FIELD OF THE DISCLOSURE

The subject disclosure relates to end-to-end (E2E) orchestration for machine learning (ML)-enabled and software-defined network (SDN)-enabled reactive and predictive (e.g., 5G) cell-on-drone (COD) dispatch and deployment.

BACKGROUND

Advances in the Internet and mobile technology have transformed the way people communicate and interact with one another. Over the years, mobile phones have become an essential part of everyday life. Mobile network operators are constantly updating their telecommunication systems to meet increasing demands for faster and more reliable service.

BRIEF DESCRIPTION OF THE DRAWINGS

Reference will now be made to the accompanying drawings, which are not necessarily drawn to scale, and wherein.

DETAILED DESCRIPTION

Figure 1:
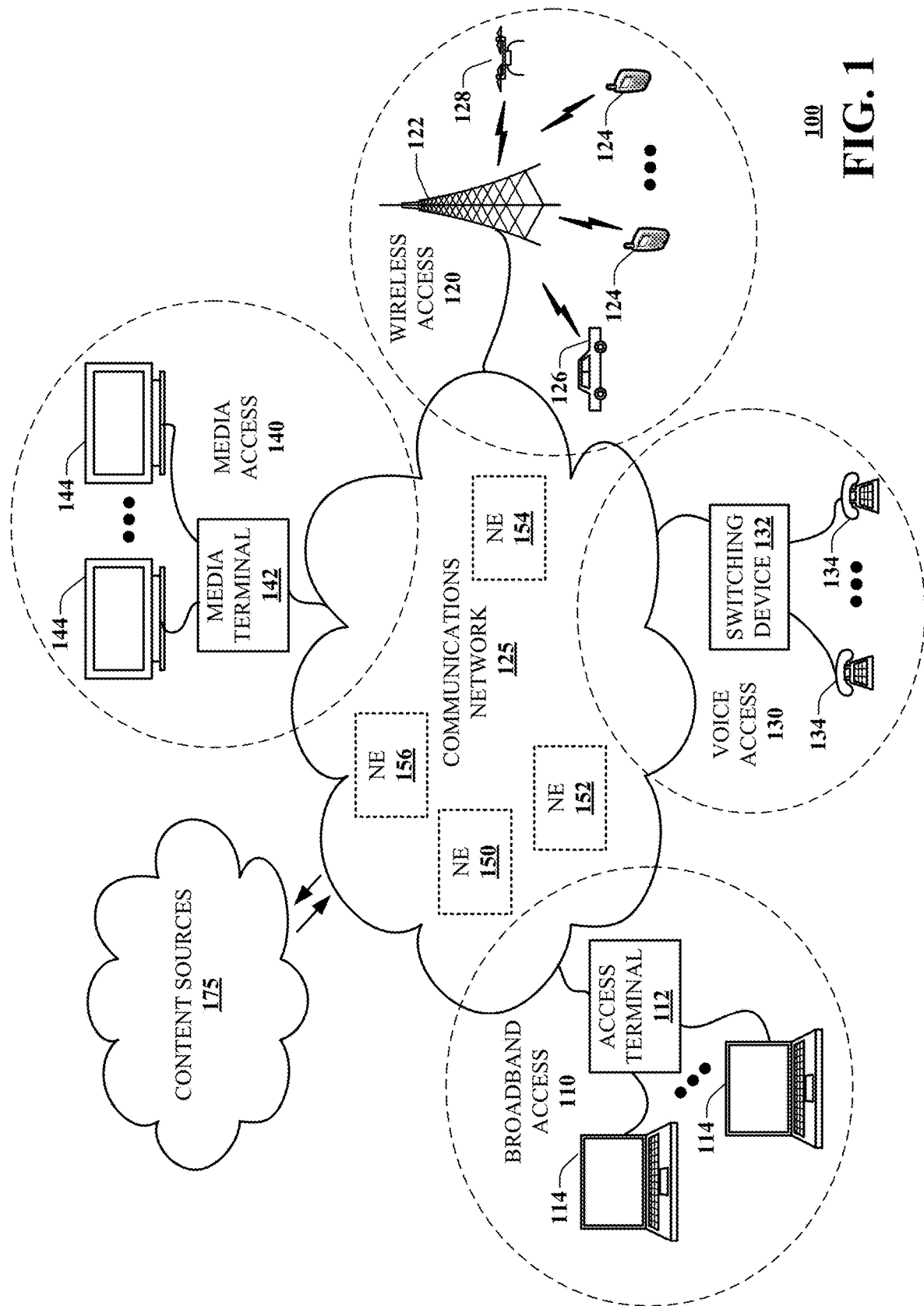
FIG. 1 is a block diagram illustrating an exemplary, non-limiting embodiment of a communications network in accordance with various aspects described herein.

The demand for network connectivity generally spikes during crowded events, such as sports games, concerts, or public demonstrations/protests. Because access network (e.g., radio access network (RAN)) capacity in a typical telecommunication system is fixed, excess traffic volume can severely impact system performance, resulting in denied or dropped calls and degraded data connectivity.

Cellular network operators typically resort to temporary solutions—i.e., deployment of Wi-Fi access points or portable base stations (e.g., cells on wheels or wings (COWs))—to offload traffic from congested cellular base stations during demand surges. However, current drone-based cell implementations require manual input/control and generally lack the capability or intelligence to predict potential traffic surges and automate dynamic mitigation. Wi-Fi deployment also comes with its own complexities.

The subject disclosure describes, among other things, illustrative embodiments of an automated system that is capable of providing end-to-end (E2E) orchestration for machine learning (ML)-enabled and software-defined network (SDN)-enabled reactive and predictive (e.g., 5G) cell-on-drone (COD) dispatch and deployment. In exemplary embodiments, the system may be configured to detect or predict traffic surges (relative to typical or baseline levels) in a given cell site and orchestrate provisioning of resources, including (e.g., safe and secure) COD deployment, to address the surge. In one or more embodiments, COD deployment may involve one or more clusters or colonies of drones equipped with low-powered cellular radio access (or small cell) nodes, where each cluster includes (or is led by) one or more SDN-equipped drones that provide intelligent SDN-on-drone (SOD) functionality.

In various embodiments, the system may include a drone colony coordinator function (DCCF) that interfaces the SOD of each cluster with one or more systems in a core network, such as a central or core ML-enabled SDN controller. In some embodiments, the DCCF may be configured to provide drone traffic management for various (e.g., all) types of drones, including facilitating usage, scheduling, and/or sharing of drones/clusters according to individual drone or cluster status, capacity, and/or availability. In exemplary embodiments, various elements (or modules) in the network, including the DCCF, each SOD, the core ML-enabled SDN, and so on, may operate under the control of a single E2E orchestration system or module in the core network, which provides for efficient and centralized orchestration of services across the various elements. In certain embodiments, the system may collaborate with a core mobility function (e.g., an access mobility function (AMF)) to detect or predict traffic surges experienced by a given RAN and reactively or predictively arrange for access alternatives, such as COD deployments. In various embodiments, an identified traffic surge may trigger (in real-time or near real-time) the DCCF to coordinate (e.g., safe and secure) drone dispatch on demand.

It is to be understood and appreciated that, while various aspects are described herein as relating to drones, some or all of these aspects may apply more broadly to uncrewed aerial vehicles (UAVs).

Intelligent leveraging of the low latency, high bandwidth advantages of drones in a mobile network (e.g., 5G, etc.), as described herein, provides a flexible, alternative access channel to address a variety of network service needs. By enabling reactive and predictive COD dispatch with centralized and automated E2E orchestration, swarms of small cell-equipped drones or UAVs may be rapidly deployed to provide RAN capacity expansion and improved (or better) on-demand coverage. This reduces or eliminates dropped calls and data connectivity issues due to traffic surges that exceed capacity limits, particularly during crowded events or during disaster recovery situations. The reactive and predictive capabilities described herein also satisfy even the most stringent (e.g., 5G) quality of service (QoS) requirements.

Exemplary embodiments described herein can be flexibly implemented in any suitable (e.g., 5G or other radio access technology (RAT)) network topology and in combination with any network slicing schemes or configurations. Various embodiments of AMF-supported traffic surge prediction and triggering of COD deployment may be incorporated in or implemented in accordance with wireless and wireline convergence (WWC) standards or the like.

It is believed that present Unmanned Aircraft Systems Traffic Management (UTM) systems lack drone traffic management capabilities that facilitate the smart, centralized E2E orchestration and drone traffic management described herein. By using licensed bands, reliable mobile network command and control schemes, and encrypted communication mechanisms (including encryptions on the radio link as well as higher layer encryption), exemplary embodiments offer differentiated QoS that match required reliability, latency, and throughput and also offer safer drone operations. In certain embodiments, the automated system may be implemented as a modification of, or as an extension to, an existing UTM system.

One or more aspects of the subject disclosure include a device, comprising a processing system including a processor, and a memory that stores executable instructions that, when executed by the processing system, facilitate performance of operations. The processing system may be implemented in a core software-defined network (SDN) controller in a core network. The operations can include determining a need to offload traffic for an access network based on communications from an access mobility function (AMF). Further, the operations can include instructing a coordinator system to identify a colony of uncrewed aerial vehicles (UAVs) that is available to offload traffic for the access network, wherein the colony of UAVs includes a UAV configured as a portable SDN and one or more other UAVs. Further, the operations can include, based on identifying the colony of UAVs, causing the colony of UAVs to be deployed to an area associated with the access network. Further, the operations can include facilitating end-to-end (E2E) orchestration across the core network and the colony of UAVs by interacting with the portable SDN of the UAV via the coordinator system.

One or more aspects of the subject disclosure include a non-transitory machine-readable medium, comprising executable instructions that, when executed by a processing system including a processor, facilitate performance of operations. The operations can include receiving, from a core software-defined network (SDN) in a core network, one or more commands to identify a colony of drones to resolve a traffic surge condition associated with an access network. Further, the operations can include, based on the receiving, communicating with one or more SDN-equipped drones to obtain drone-related data, wherein each of the one or more SDN-equipped drones is associated with a respective colony of drones of a plurality of colonies of drones. Further, the operations can include, responsive to the communicating, identifying a particular colony of drones of the plurality of colonies of drones to resolve the traffic surge condition. Further, the operations can include facilitating interactions between the core SDN and an SDN-equipped drone in the particular colony of drones to enable deployment of the particular colony of drones and end-to-end (E2E) orchestration relating to the particular colony of drones.

One or more aspects of the subject disclosure include a method. The method can comprise obtaining, by a processing system including a processor, and from a coordinator function, a request for information associated with a plurality of drones, wherein the request relates to a detected or predicted decrease in available capacity of an access network. Further, the method can include, responding, by the processing system, to the coordinator function with data regarding the plurality of drones. Further, the method can include, after the responding, receiving, by the processing system, one or more commands to dispatch the plurality of drones to a coverage area corresponding to the access network. Further, the method can include, causing, by the processing system, the plurality of drones to travel to the coverage area to offload traffic for the access network.

Other embodiments are described in the subject disclosure.

Referring now to FIG. 1, a block diagram is shown illustrating an example, non-limiting embodiment of a system 100 in accordance with various aspects described herein. For example, system 100 can facilitate, in whole or in part, end-to-end (E2E) orchestration for machine learning (ML)-enabled and software-defined network (SDN)-enabled reactive and predictive (e.g., 5G) cell-on-drone (COD) dispatch and deployment, as described elsewhere herein, such as with respect to FIG. 2A. In particular, a communications network 125 is presented for providing broadband access 110 to a plurality of data terminals 114 via access terminal 112, wireless access 120 to a plurality of mobile devices 124, vehicle 126, and UAV 128 via base station or access point 122, voice access 130 to a plurality of telephony devices 134, via switching device 132 and/or media access 140 to a plurality of audio/video display devices 144 via media terminal 142. In addition, communications network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
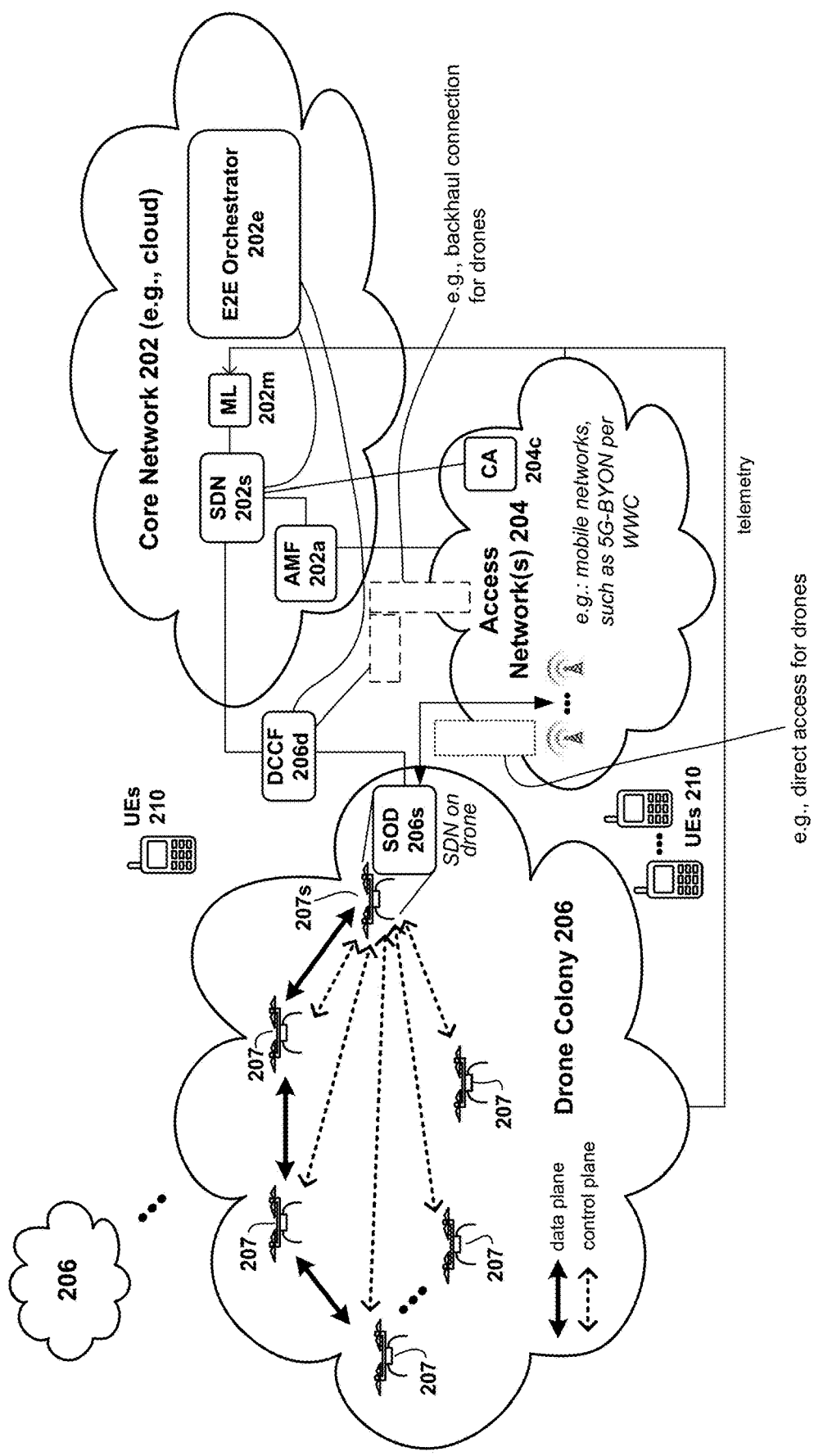
FIG. 2A is a block diagram illustrating an example, non-limiting embodiment of a system functioning within, or operatively overlaid upon, the communications network of FIG. 1 in accordance with various aspects described herein.

FIG. 2A is a block diagram illustrating an example, non-limiting embodiment of an enhanced E2E architecture 200 (e.g., a network system 200) functioning within, or operatively overlaid upon, the communications network 100 of FIG. 1 in accordance with various aspects described herein. In exemplary embodiments, the architecture 200 may provide dynamic, automated E2E orchestration for COD deployment. In various embodiments, an ML-enabled core SDN may collaborate with an AMF to identify traffic surges, and may interact with an SDN-enabled drone traffic management system to effect COD deployment to address the surges. As shown in FIG. 2A, the architecture 200 may include a core network 202, one or more access networks (e.g., a WWC-RAN) 204, a DCCF 206d, and one or more drone colonies 206.

In various embodiments, the core network 202 may include network devices and/or systems that provide a variety of functions. In certain embodiments, the core network 202 may be implemented in a cloud architecture. Examples of functions provided by, or included, in the core network 202 include an AMF 202a configured to facilitate mobility management in a control plane of the network system 200 (including, for instance, providing user equipment (UE) mobility information associated with the access network(s) 204 and/or the drone colonies 206 to the core network 202), a user plane function (UPF) configured to provide access to a data network, such as a packet data network (PDN), in a user (or data) plane of the network system 200, a Unified Data Management (UDM) function, a Session Management Function (SMF), a policy control function (PCF), and/or the like. The core network 202 may be in communication with one or more other networks (e.g., one or more content delivery networks (CDNs)), one or more services, and/or one or more devices. In one or more embodiments, the core network 202 may include one or more devices implementing other functions, such as a master user database server device for network access management, a PDN gateway server device for facilitating access to a PDN, and/or the like. The core network 202 may include various physical/virtual resources, including server devices, virtual environments, databases, and so on.

As depicted, the core network 202 may include an SDN controller 202s, an ML system 202m, and an E2E orchestrator 202e. The SDN controller 202s of an SDN may allow the network system 200 to separate control plane operations from data plane operations, and can enable layer abstraction for separating service and network functions or elements from physical network functions or elements. In one or more embodiments, the SDN controller 202s may coordinate networking and provisioning of applications and/or services. The SDN controller 202s may manage transport functions for various layers or segments within the network system 200, and can access application functions for layers above the network system 200. The SDN controller 202s may provide a platform for network services, network control of service instantiation and management, as well as a programmable environment for resource and traffic management. The SDN controller 202s may also permit a combination of real-time data from the service and network elements with real-time, or near real-time, control of a forwarding plane. In various embodiments, the SDN controller 202s may enable flow set up in real-time, network programmability, extensibility, standard interfaces, and/or multi-vendor support.

In various embodiments, the system 200 may include multiple SDN controllers 202s (e.g., one or more for a front-haul link of the network, one or more for a back-haul link, etc.). In one or more embodiments, the SDN controller 202s may be implemented using open source software (e.g., an application programming interface (API) written based on Python or the like, such as a RYU controller utilizing an OpenFlow protocol) configured to manage network flows. In certain embodiments, the SDN controller 202s may leverage an operating system (OS) (e.g., a 5G-EmPOWER OS providing OpenEmPOWER protocol or the like) configured to manage multiple heterogenous RANs and that provides management functions/services.

In exemplary embodiments, the E2E orchestrator 202e may be configured to provide (or interact with one or more domain, segment, and/or layer controllers to provide) global slice management and coupled E2E orchestration. In various embodiments, the E2E orchestrator 202e may additionally be capable of performing failover management, load balancing, and/or global network management—i.e., disaster recovery for network services and segments (e.g., emergency response networks), self-healing/optimization (e.g., closed loop management), and/or other services (e.g., for 5G broadband or the like).

The ML system 202m may be configured to obtain data regarding the various network layers/segments (i.e., core network, RAN, drone colonies, etc.), perform analytics on the data in accordance with ML model(s), and selectively provide model outputs to the E2E orchestrator 202m and/or the SDN controller 202s. In exemplary embodiments, the ML system 202m may interact with the SDN controller 202s to obtain data regarding the network (e.g., radio/wireline) environment in real-time or near real-time. The ML system 202m may utilize the ML model(s) to analyze the data so as to monitor and ascertain (e.g., in real-time or near real-time) conditions of the core network 202, the access network(s) 204, the drone colonies 206, and/or the radio/wireline environment.

In various embodiments, the ML system 202m may additionally (e.g., separately) obtain raw data (e.g., telemetry data) from other elements of the network, such as some or all of the equipment and links in the core network 202, the access network(s) 204, and/or the drone colonies 206 (e.g., via an SOD 206s), and utilize ML model(s) to analyze the raw data. Raw data may include counter values, key capacity indicator (KCI) values, key performance indicator (KPI) values, thresholds, alarm information, and/or the like relating to the core network 202, the access network(s) 204, the drone colonies 206, radio link resources, wireline resources, and/or network traffic associated with these network segments or layers.

In one or more embodiments, the ML system 202*m* may be capable of performing aggregation and advanced analysis (e.g., in a unified manner) of all available network/radio/wireline data from the SDN controller 202*s* as well as from various elements of the overall network across different network segments or layers. Such aggregation and analysis may be performed in a streaming mode (e.g., in real-time or near real-time) and/or in a batch mode (e.g., in non-real-time).

In exemplary embodiments, the ML system 202*m* may derive outputs from one or more analyses and output or feed information to the E2E orchestrator 202*e*. The information may include data regarding system (e.g., server, virtual machine, or resource) failures or non-optimal system performance (e.g., performance below certain threshold(s)). The ML system 202*m* may provide trend analysis and/or global counter/KCI/KPI value comparisons (e.g., with threshold(s)) to proactively detect/diagnose, isolate, and address/fix network issues at a global level (across network segments or layers). This enables the E2E orchestrator 202*e* to identify the root cause of an issue and perform auto-recovery of the network and E2E network slicing rearrangements to address issues in a timely manner based on AI analytics.

In various embodiments, the ML system 202*m* may be configured to reduce any error in the derivations/predictions of outputs, appropriate action(s) to take, and so on. In this way, any error that may be present may be provided as feedback to the algorithm(s), such that the error may tend to converge toward zero as the algorithm(s) are utilized more and more.

In various embodiments, an access network 204 may include a wireless RAN, a Wi-Fi network, and/or a wireline network. In exemplary embodiments, the access network 204 may be implemented in open source software (e.g., in an OpenAirInterface (OAI) wireless technology platform). The access network 204 may include network resources, such as one or more control agents (CA) 204*c*, physical access resources, and/or one or more virtual access resources. CA(s) 204*c* may provide access-network-related data to the SDN 202*s* and perform actions based on commands from the SDN 202*s*. Physical access resources can include base station(s) (e.g., one or more eNodeBs, one or more gNodeBs, or the like), one or more satellites, one or more Gigabyte Passive Optical Networks (GPONs) or related components (e.g., Optical Line Terminal(s) (OLT), Optical Network Unit(s) (ONU), etc.), and/or the like. A base station may employ any suitable RAT, such as 4G/long term evolution (LTE), 5G, 6G, or any higher generation RAT. One or more edge computing devices (e.g., multi-access edge computing (MECs) devices or the like) may also be included in or associated with the access network 204.

Presently, there are ongoing efforts to create technical specifications for 5G wireless wireline convergence (WWC) architectures, where fixed wireless and wireline access networks are brought on to leverage the common 5G core (5GC). For instance, an access gateway function (AGF) has been defined to provide certain hierarchical traffic shaping and policing functionality for a fixed network (FN) and 5G residential gateway(s) (RG(s)) served from a $3^{rd}$ Generation Partnership Project (3GPP) UPF, where a PCF and an authentication server function (AUSF) are shared across mobile, fixed wireless, and wireline access networks. In some embodiments, wireline access resources in the access network 204 may be associated with one or more AGFs that facilitate communications with the core network 202 (e.g., enabling wireline-based systems to leverage a 5G core or the like).

Virtual access resources can include a voice service system (e.g., a hardware and/or software implementation of voice-related functions), a video service system (e.g., a hardware and/or software implementation of video-related functions, such as coder-decoder or compression-decompression (CODEC) components or the like), a security service system (e.g., a hardware and/or software implementation of security-related functions), and/or the like. In one or more embodiments, the access network 204 may include any number/types of physical/virtual access resources and various types of heterogeneous cell configurations with various quantities of cells and/or types of cells.

In certain embodiments, the access network 204 may be implemented as a virtual RAN, where radio/wireline functions are implemented as general-purpose applications/apps that operate in virtualized environments and interact with physical resources either directly or via full/partial hardware emulation. Virtualized software radio applications can be delivered as a service and managed through a cloud controller. Here, base stations may be implemented as (e.g., passive) distributed radio elements connected to a centralized baseband processing pool.

The system 200 can provide services to various types of UEs 210. Examples of UEs 210 include mobile devices 124, display and television devices, home and business networks, IoT devices, video and audio devices, and so on. A UE may be equipped with one or more transmitter (Tx) devices and/or one or more receiver (Rx) devices configured to communicate with, and utilize network resources of, the system 200. UEs may (separately or simultaneously) connect to one or more network slices provided in the network system 200.

In one or more embodiments, COD deployment may involve one or more clusters or colonies 206 of UAVs or drones 207. A drone 207 may include any personal or commercial aerial vehicle or device equipped with one or more types of devices or components for performing various actions. In certain embodiments, a drone 207 may include one or more radio equipment configured to function as a cellular relay (e.g., low-powered cellular radio access (or small cell) node(s)), one or more sensors (e.g., image sensor(s), infrared sensor(s), near infrared camera(s), radar system(s), light detection and ranging (LIDAR) system(s), biological sensor(s), temperature sensor(s), chemical sensor (s), humidity sensor(s), and/or the like) for capturing information/data in an environment of the drone 207, one or more mechanical limbs for physically manipulating external objects, and/or the like.

In exemplary embodiments, each drone colony 206 may include one or more SDN-equipped drones 207*s* (e.g., one or more master drones 207*s*) that provide intelligent SDN functionality—i.e., SDN-on-drone (or SOD) 206*s* functionality. In one or more embodiments, the SOD controller 206*s* may be configured to communicate with and/or control operations of one or more drones 207 (e.g., each drone 207, which may be considered slave drones 207) in a given drone colony 206.

The SOD 206*s* (or portable SDN) may interact with the core SDN 202*s* via the DCCF 206*d*. In various embodiments, the SOD 206*s* may interact with the core SDN 202*s* on demand (e.g., by the SDN 202s) and/or in accordance with a predetermined schedule. In exemplary embodiments, the SOD 206s may (e.g., continuously) obtain various drone-related data from its managed drones 207, including, for instance, location data, battery power status information, information regarding available capacity/bandwidth, information regarding current throughput, information regarding small cell type, capability data, and/or the like. In certain embodiments, the SOD 206s may manage or control interactions between drones 207 by restricting or permitting a given drone 207 to communicate with one or more other drones 207 in a given drone colony 206 or otherwise. In some embodiments, the SOD 206s may determine routing for the drones 207 in the drone colony 206 and control movement of the drones 207 based on the determined routing. In various embodiments, the SOD 206s may be capable of adding drones to its drone colony 206 and/or removing drones therefrom. In certain implementations, the SOD 206s may assign IDs to its associated drones 207 and maintain a working list of its associated drones 207.

In exemplary embodiments, none of the non-SOD drones 207 in a drone colony 206 may communicate with the DCCF 206d without interacting with an SOD 206s (i.e., a drone 207s). In alternate embodiments, one or more non-SOD drones 207 in a drone colony 206 may communicate directly with the DCCF 206d without interacting with an SOD 206s. In certain embodiments, the drone 207s may be a "special" SOD 206s that is configured or designated to provide security functions (e.g., higher security encryption mechanism).

In some embodiments, the SOD 206s may be configured to (e.g., periodically or based on command by the DCCF 206d and/or the SDN 202s) upload drone-related data and/or network-related data to the DCCF 206d and/or the SDN 202s for storage or archiving. In certain embodiments, the SOD 206s may additionally, or alternatively, erase some or all of such data from its memory to ensure that sufficient memory is available for future drone-related operations.

In exemplary embodiments, the DCCF 206d may be configured to provide drone traffic management for the various drones 207s and 207, including facilitating usage, scheduling, and/or sharing of these drones according to individual drone or cluster status, capacity, and/or availability. In one or more embodiments, the DCCF 206d may be implemented in one or more edge computing devices proximate to (e.g., within a threshold distance from) a base station. In other embodiments, the DCCF 206d may be implemented elsewhere, such as in the core network 202 or an access network 204.

In various embodiments, the DCCF 206d may interface the SDN 202s with the SOD 206s of each cluster or colony. The DCCF 206d may interface with these network elements using any suitable medium, such as over the air and/or via a wired medium (e.g., fiber). Although FIG. 2A shows the SOD 206s as interacting with SDN 202s only via the DCCF 206d, in certain alternate embodiments, the SOD 206s and the SDN 202s may communicate with each other directly (e.g., without an intermediary DCCF 206d) or via a different intermediary device or system.

In certain embodiments, the DCCF 206d may be configured to handle (e.g., all) internal and external communication tasks associated with each drone colony 206 as well as processing drone flight approvals, performing deconflicts for drone flights, and providing overall safe and secure drone dispatch on demand. In various embodiments, the DCCF 206d may coordinate with manned aviation and associated air traffic control systems to ensure compliance with low-altitude airspace restrictions. In some embodiments, the DCCF 206d may receive and utilize supplemental data feeds relating to weather, environmental conditions, and/or the like to aid in its decision-making. In various embodiments, the E2E orchestrator 202e and/or the core SDN 202s may communicate with the DCCF 206d to obtain drone flight approvals and/or to (e.g., periodically) report the status of drone flights. This can be facilitated, for instance, via telemetry reports that keep the DCCF 206d updated on the overall status of the airspace. In one or more embodiments, drone tracking may be supported by a mobile positioning service integrated in or provided by the DCCF 206d. In various embodiments, the DCCF 206d may receive various drone-related data from a given SOD 206s for the corresponding drone 207s and/or other managed drones 207 in the associated drone colony 206. The DCCF 206d may utilize some or all of this information for its drone traffic management functions.

In certain embodiments, the SDN 202s and/or the DCCF 206d may be configured to reconfigure a given drone 207 to function as an SOD 206s (i.e., to function as a drone 207s) and/or de-configure SDN functionality in a drone 207s. In various embodiments, the SDN 202s and/or the DCCF 206d may manage multiple SODs 206s within a given drone colony 206 or among numerous drone colonies 206. In some embodiments, certain intensive computations or functions may be implemented in the DCCF 206d rather than in the SOD 206s, which can alleviate the SOD 206s from utilizing too much of its resources for data processing that can otherwise be performed in the DCCF 206d. For instance, computational- and/or data communication-intensive functions that can overwhelm wireless network bandwidth include those relating to self-healing (e.g., traffic control self-adaptation using local drone cluster data).

It is to be understood and appreciated that the various components—e.g., the SDN 202s, AMF 202a, DCCF 206d, SOD 206s, access network 204 (e.g., CA 204c), E2E orchestrator 202e, ML system 202m, drones 207, etc.—may employ any suitable (e.g., predefined) handshake/signaling messages to interact with one another.

The following is a brief description of an example (e.g., automated) process of E2E orchestration for ML-enabled and SDN-based reactive and predictive COD dispatch/deployment. In exemplary embodiments, the AMF 202a may, based on data received from an access network 204, detect and/or predict a traffic surge condition in the access network 204. For instance, the AMF 202a may identify more than a threshold number of UEs 210 connecting to the access network 204, identify a decrease in available network capacity (e.g., to below a threshold value) in the access network 204, and/or the like. In various embodiments, the AMF 202a may provide an indication of the traffic surge condition to the SDN 202s, which may, in turn, intelligently identify alternative(s) to address the traffic surge. For instance, the SDN 202s may identify access network-expansion alternative(s), such as small cell-equipped drones 207s/207, that can be deployed to offload the traffic from the access network 204. Offloading traffic may include establishing connections with some UEs located in the coverage area of the access network 204 such that the access network 204 is relieved from having to serve those UEs. In certain embodiments, the SDN 202s may identify the alternative(s) in accordance with one or more predefined policies or business logic/rules, such as policies on when or how drones may be deployed to alleviate traffic surge conditions, the types of drones (e.g., having certain capabilities relating to capacity, battery power, memory, etc.) that are suitable for deployment, how close the drones must be in relation to a base station in the access network 204 in order to be considered for deployment, select types of traffic that must have surged in order for drone deployment to be considered, priority levels to set for certain types of traffic or services, and/or the like.

In exemplary embodiments, the SDN 202s may interact with the DCCF 206d to identify the alternative(s). For instance, the SDN 202s may perform a "hunting" process by having the DCCF 206d obtain or provide information (e.g., including telemetry information) regarding one or more drones 207s/207 and/or drone colonies 206, including some or all of the aforementioned drone-related data. For instance, the DCCF 206d may communicate with one or more (e.g., some or all of the) drone colonies 206 (e.g., one or more SODs 206s) for their availability, location, capacity, capabilities, and/or other drone-related data.

The SDN 202s may utilize the information and coordinate with the E2E orchestrator 202e to define and execute a (e.g., safe and secure) drone deployment plan. In one or more embodiments, the SDN 202s may utilize outputs from the ML 202m (which may, for example, be derived from model-based processing of historical data and real-time or near real-time telemetry data associated with the access network(s) 204, one or more drone colonies 206, etc.) as part of its coordination with the E2E orchestrator 202e. In this way, command and control (C2) may be effected based on some or all of the known information about portions or an entirety of the overall network.

In some embodiments, the E2E orchestrator 202e may perform drone deployment functions. In alternate embodiments, some or all of the drone deployment functions may be performed in one or more other systems, such as the SDN 202s, the DCCF 206d, the CA 204c, etc. In any case, where a particular SOD 206s (i.e., drone 207s) is selected to facilitate management of a drone colony 206 for alleviating the traffic surge at the access network 204, the SOD 206s, and its associated drone colony 206, may be dispatched to a determined area proximate to (e.g., within a threshold distance from a base station of) the access network 204. For instance, the SOD 206s may instruct drones 207 in its drone colony 206 to physically route to respective destinations and initiate small cell modules and/or other functionality (e.g., communication encryption mechanisms, power management, etc. in accordance with the aforementioned policies or rules). The SOD 206s may maintain periodic communications with its managed drones 207. In various embodiments, the drones 207 (including drone 207s) in the drone colony 206 may provide network connectivity by way of wireless "tethering" to (e.g., a base station or the like of) the access network 204 or a different access network 204 (i.e., one that is not experiencing a traffic surge condition) and/or via a wired link (e.g., over a fiber connection) to a network device (e.g., edge computing device or the like) that has a backhaul connection to the core network 202. Drones 207 and/or 207s in the drone colony 206 may additionally, or alternatively, communicate data (e.g., control data, user data, etc.) via the wireless tethering or wired link.

In this way, drone colonies can be reactively or predictively deployed to provide traffic offloading for affected access networks 204 or to provide network connectivity in a disaster recovery situation.

It is to be understood and appreciated that the quantity and arrangement of systems, networks, orchestrators, controllers, functions, devices, colonies, UAVs/drones, and/or agents shown in FIG. 2A are provided as an example. In practice, there may be additional systems, networks, orchestrators, controllers, functions, devices, colonies, UAVs/drones, and/or agents, fewer systems, networks, orchestrators, controllers, functions, devices, colonies, UAVs/drones, and/or agents, different systems, networks, orchestrators, controllers, functions, devices, colonies, UAVs/drones, and/or agents, or differently arranged systems, networks, orchestrators, controllers, functions, devices, colonies, UAVs/drones, and/or agents than those shown in FIG. 2A. For example, the system 200 can include more or fewer systems, networks, orchestrators, controllers, functions, devices, colonies, UAVs/drones, and/or agents, etc. In practice, therefore, there can be hundreds, thousands, millions, billions, etc. of such systems, networks, orchestrators, controllers, functions, devices, colonies, UAVs/drones, and/or agents. In this way, example system 200 can coordinate, or operate in conjunction with, a set of systems, networks, orchestrators, controllers, functions, devices, colonies, UAVs/drones, and/or agents and/or operate on data sets that cannot be managed manually or objectively by a human actor. Furthermore, two or more systems, networks, orchestrators, controllers, functions, devices, colonies, UAVs/drones, or agents shown in FIG. 2A may be implemented within a single system, network, orchestrator, controller, function, device, colony, UAV/drone, or agent, or a single system, network, orchestrator, controller, function, device, colony, UAV/drone, or agent shown in FIG. 2A may be implemented as multiple systems, networks, orchestrators, controllers, functions, devices, colonies, UAVs/drones, or agents. Additionally, or alternatively, a set of systems, networks, orchestrators, controllers, functions, devices, colonies, UAVs/drones, or agents of the system 200 may perform one or more functions described as being performed by another set of systems, networks, orchestrators, controllers, functions, devices, colonies, UAVs/drones, or agents of the system 200.

It is also to be understood and appreciated that, although FIG. 2A is described above as pertaining to various processes and/or actions that are performed in a particular order, some of these processes and/or actions may occur in different orders and/or concurrently with other processes and/or actions from what is depicted and described above. Moreover, not all of these processes and/or actions may be required to implement the systems and/or methods described herein.

Figure 2B:
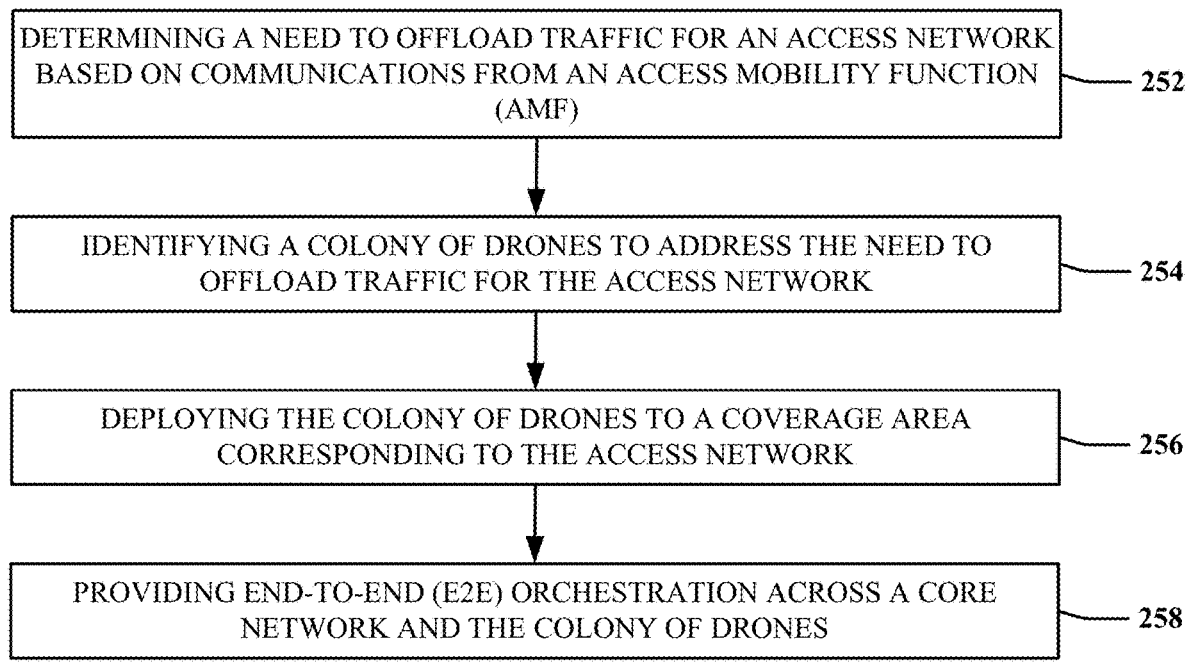
FIG. 2B depicts an illustrative embodiment of a method in accordance with various aspects described herein.

FIG. 2B depicts an illustrative embodiment of a method 250 in accordance with various aspects described herein.

At 252, the method can include determining a need to offload traffic for an access network based on communications from an access mobility function (AMF). For example, the SDN 202s can, similar to that described above with respect to the system 200 of FIG. 2A, perform one or more operations that include determining a need to offload traffic for an access network 204 based on communications from the AMF 202a. For instance, the SDN 202s can predict or detect that an access network 204 is experiencing a traffic surge condition.

At 254, the method can include identifying a colony of drones to address the need to offload traffic for the access network. For example, the DCCF 206d can, similar to that described above with respect to the system 200 of FIG. 2A, perform one or more operations that include identifying a drone colony 206 to address the need to offload traffic for the access network 204. For instance, the DCCF 206d can communicate with one or more SDN-equipped drones 207s (i.e., SODs 206s) to obtain drone-related data for the drone(s) 207s and/or associated drones 207.

At 256, the method can include deploying the colony of drones to a coverage area corresponding to the access network. For example, the SDN 202s and/or the DCCF 206d can, similar to that described above with respect to the system 200 of FIG. 2A, perform one or more operations that include deploying the drone colony 206 to a coverage area corresponding to the access network 204. For instance, the SDN 202s and/or the DCCF 206d may generate and provide routing instructions to the SODs 206s to cause the drone colony 206 to respectively travel to particular locations in the coverage area.

At 258, the method can include providing end-to-end (E2E) orchestration across a core network and the colony of drones. For example, the E2E orchestrator 202e can, similar to that described above with respect to the system 200 of FIG. 2A, perform one or more operations that include providing E2E orchestration across the core network 202 and the drone colony 206. For instance, the E2E orchestrator 202e may coordinate with the SDN 202s, which may, in turn, coordinate with the SOD 206s (and thus the drone colony 206) via the DCCF 206d to enable orchestration of services for UEs 210, manage network slicing, etc.

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
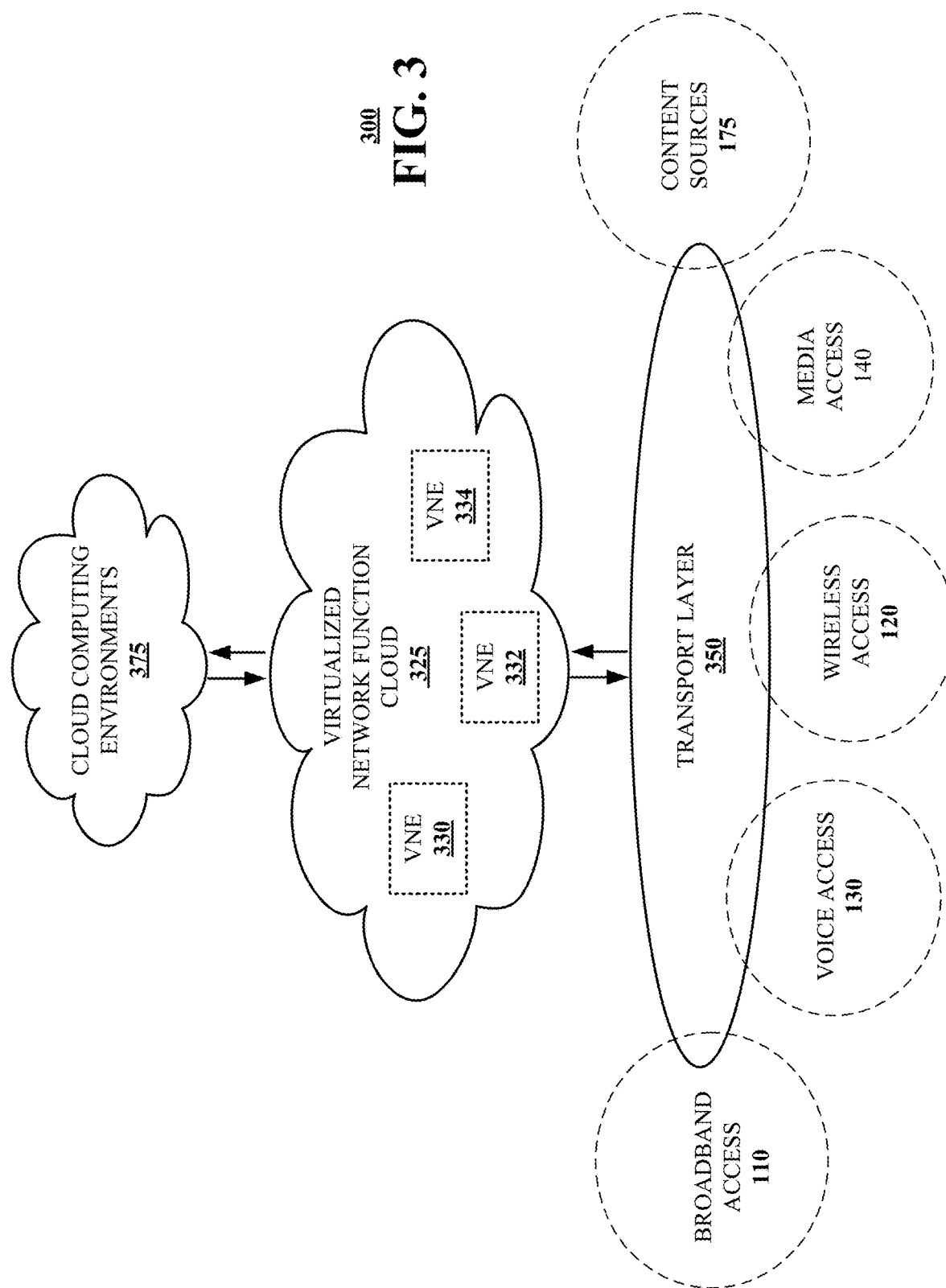
FIG. 3 is a block diagram illustrating an example, non-limiting embodiment of a virtualized communications network in accordance with various aspects described herein.

Referring now to FIG. 3, a block diagram 300 is shown illustrating an example, non-limiting embodiment of a virtualized communications network in accordance with various aspects described herein. In particular, a virtualized communications network is presented that can be used to implement some or all of the subsystems and functions of system 100, the subsystems and functions of system 200, and method 250 presented in FIGS. 1, 2A, and 2B. For example, virtualized communications network 300 can facilitate, in whole or in part, end-to-end (E2E) orchestration for machine learning (ML)-enabled and software-defined network (SDN)-enabled reactive and predictive (e.g., 5G) cell-on-drone (COD) dispatch and deployment.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communications network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward substantial amounts of traffic, their workload can be distributed across a number of servers—each of which adds a portion of the capability, and which creates an overall elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
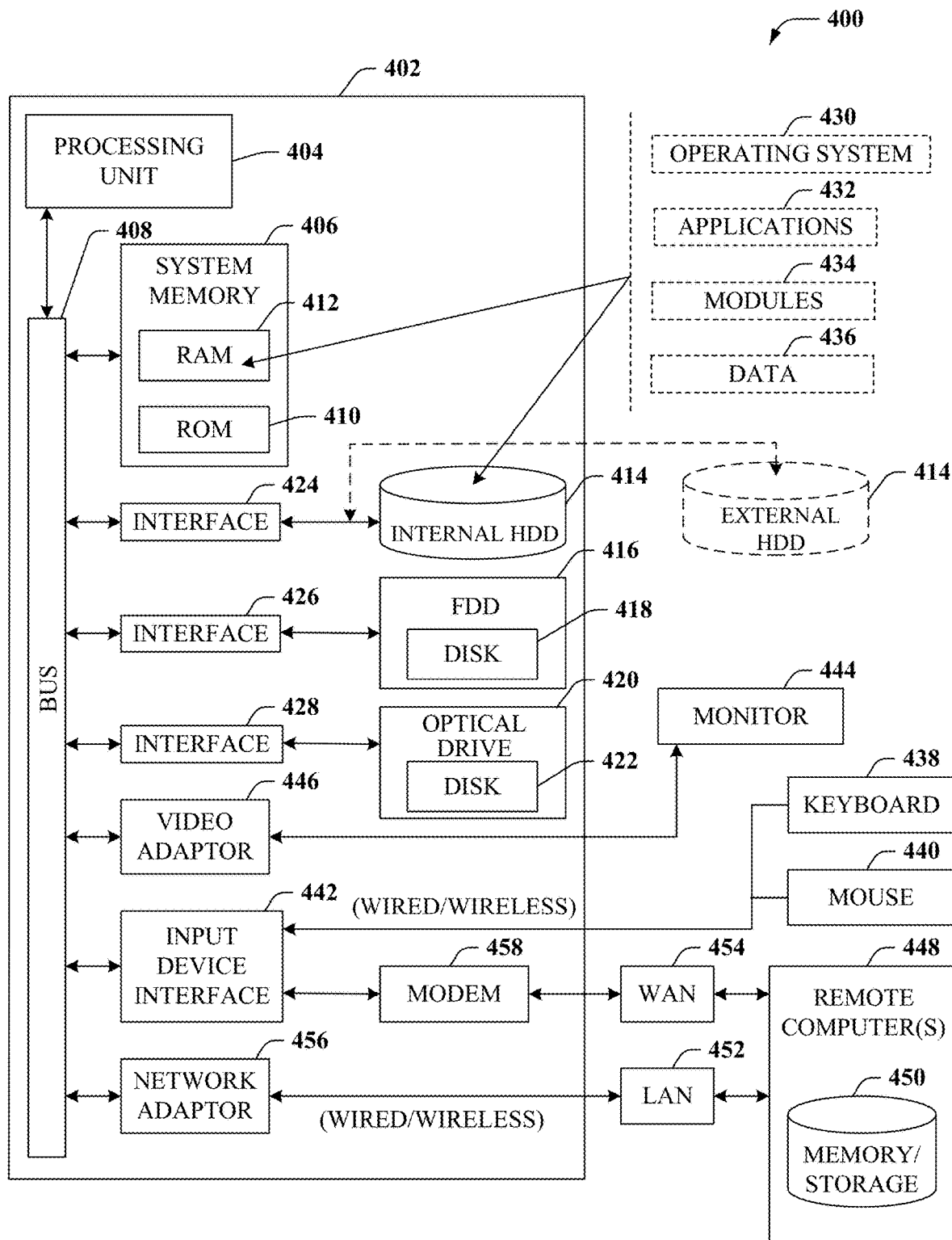
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate, in whole or in part, end-to-end (E2E) orchestration for machine learning (ML)-enabled and software-defined network (SDN)-enabled reactive and predictive (e.g., 5G) cell-on-drone (COD) dispatch and deployment.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communications network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are examples and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
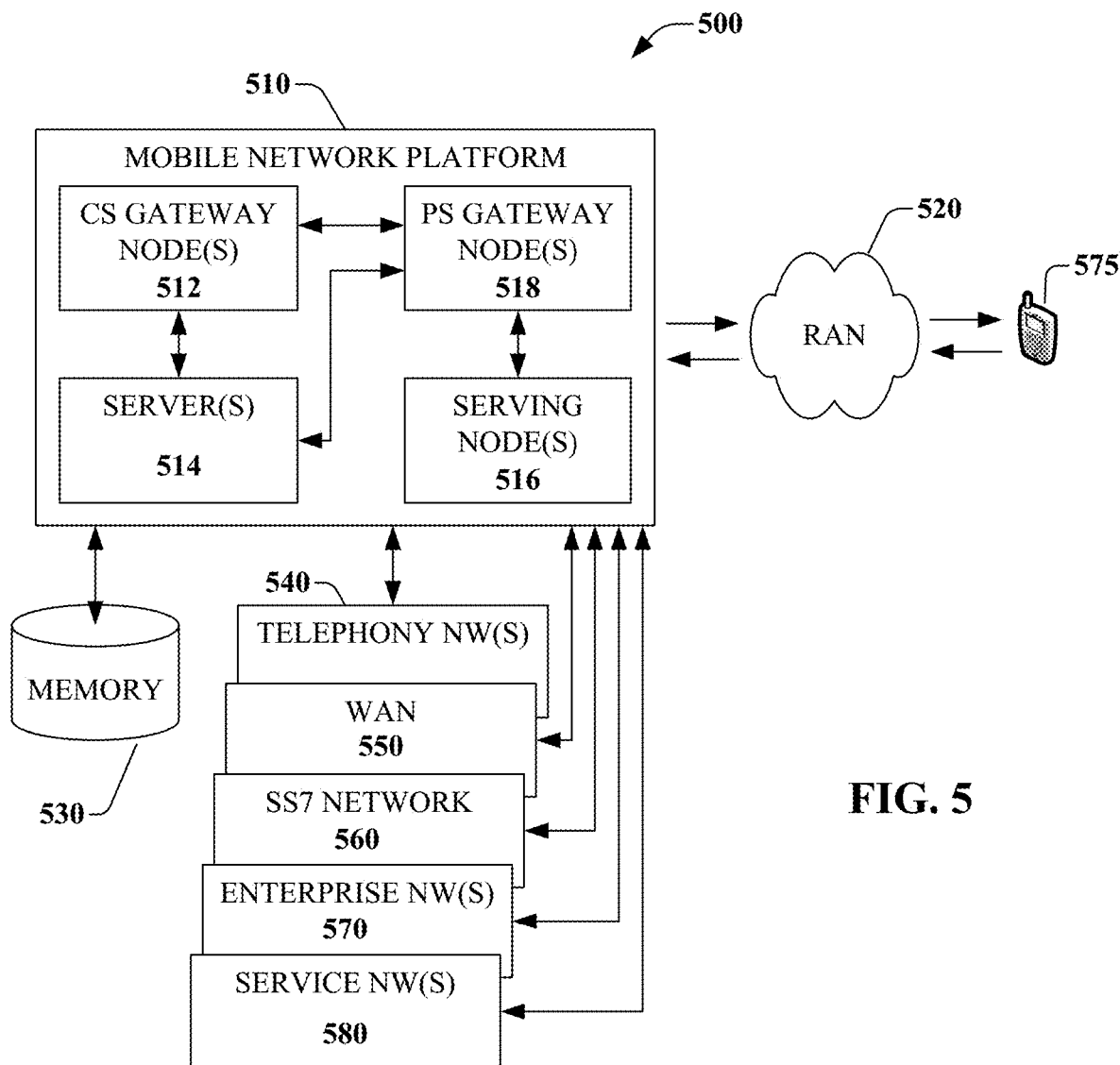
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate, in whole or in part, end-to-end (E2E) orchestration for machine learning (ML)-enabled and software-defined network (SDN)-enabled reactive and predictive (e.g., 5G) cell-on-drone (COD) dispatch and deployment. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, which facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as distributed antenna networks that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
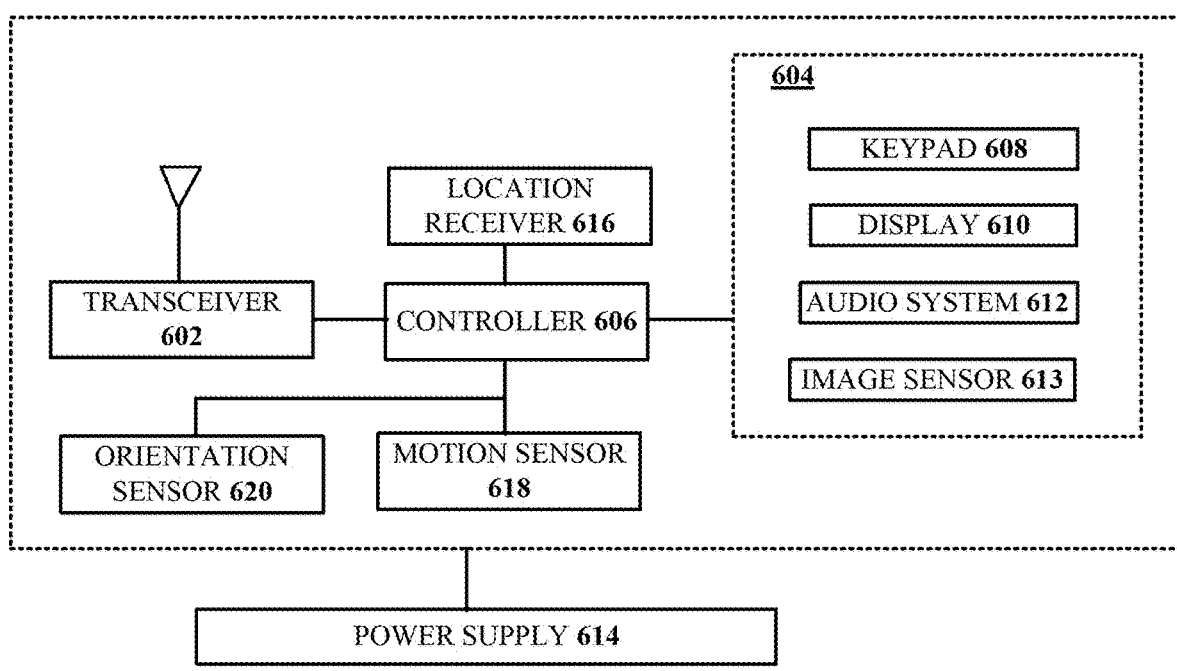
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via communications network 125. For example, computing device 600 can facilitate, in whole or in part, end-to-end (E2E) orchestration for machine learning (ML)-enabled and software-defined network (SDN)-enabled reactive and predictive (e.g., 5G) cell-on-drone (COD) dispatch and deployment.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access point by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

In various embodiments, threshold(s) may be utilized as part of determining/identifying one or more actions to be taken or engaged. The threshold(s) may be adaptive based on an occurrence of one or more events or satisfaction of one or more conditions (or, analogously, in an absence of an occurrence of one or more events or in an absence of satisfaction of one or more conditions).

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communications network) can employ various AI-based schemes for conducting various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)=\text{confidence (class)}$. Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communications network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to," "coupled to," and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor, wherein the processing system is implemented in a core software-defined network (SDN) controller in a core network; and
a memory that stores executable instructions that, when executed by the processing system, facilitate performance of operations, the operations comprising:
determining a need to offload traffic for an access network based on communications from an access mobility function (AMF);
instructing a coordinator system to identify a colony of uncrewed aerial vehicles (UAVs) that is available to offload traffic for the access network, wherein the colony of UAVs includes a UAV configured as a portable SDN and one or more other UAVs,
wherein the coordinator system is configured to coordinate deployment of the colony of UAVs by transmitting flight routing instructions to the portable SDN;
based on identifying the colony of UAVs, causing the colony of UAVs to be deployed to an area associated with the access network; and
facilitating end-to-end (E2E) orchestration across the core network and the colony of UAVs by interacting with the portable SDN of the UAV via the coordinator system, the coordinator system providing a network interface between the portable SDN and the core SDN controller.

2. The device of claim 1, wherein the determining comprises predicting that the access network is experiencing a traffic surge condition.

3. The device of claim 1, wherein the core SDN controller leverages outputs from a machine learning (ML) system to support deployment of the colony of UAVs, the E2E orchestration, or both.

4. The device of claim 3, wherein the ML system receives telemetry data from the access network, the colony of UAVs, or both.

5. The device of claim 1, wherein the coordinator system provides UAV flight approvals, performs deconflicts for UAV flights, or both.

6. The device of claim 1, wherein the coordinator system is an extension of an Uncrewed Aircraft Systems Traffic Management (UTM) system.

7. The device of claim 1, where the colony of UAVs is one of a plurality of colonies of UAVs, and wherein the coordinator system is configured to interact with each colony of UAVs of the plurality of colonies of UAVs.

8. The device of claim 1, wherein the access network comprises a radio access network (RAN).

9. The device of claim 1, wherein the access network is implemented in accordance with a wireless wireline convergence (WWC) standard.

10. A non-transitory machine-readable medium, comprising executable instructions that, when executed by a processing system including a processor, facilitate performance of operations, the operations comprising:
receiving, by the processing system from a core software-defined network (SDN) in a core network, one or more commands to identify a colony of drones to resolve a traffic surge condition associated with an access network;
based on the receiving, communicating, by the processing system with one or more SDN-equipped drones to obtain drone-related data, wherein each of the one or more SDN-equipped drones is associated with a respective colony of drones of a plurality of colonies of drones;
responsive to the communicating, identifying, by the processing system, a particular colony of drones of the plurality of colonies of drones to resolve the traffic surge condition;
facilitating, by the processing system, interactions between the core SDN and an SDN-equipped drone in the particular colony of drones to enable deployment of the particular colony of drones and end-to-end (E2E) orchestration relating to the particular colony of drones, and
coordinating, by the processing system, the deployment of the particular colony of drones by transmitting flight routing information to the SDN-equipped drone,
wherein the processing system comprises a drone colony coordinator function (DCCF), and wherein the DCCF provides a network interface between the core SDN and the SDN-equipped drone.

11. The non-transitory machine-readable medium of claim 10, wherein each colony of drones of the plurality of colonies of drones further includes one or more drones that are not equipped with SDN functionality.

12. The non-transitory machine-readable medium of claim 10, wherein the one or more commands are provided by the core SDN based on reactive or predictive identification of the traffic surge condition.

13. The non-transitory machine-readable medium of claim 10, wherein the deployment of the particular colony of drones and the E2E orchestration relating to the particular colony of drones are in accordance with one or more business policies.

14. A method, comprising:
obtaining, by a processing system including a processor, from a coordinator function, a request for information associated with a plurality of drones, wherein the request relates to a detected or predicted decrease in available capacity of an access network
wherein the coordinator function is configured to coordinate deployment of the plurality of drones by transmitting flight routing instructions to the processing system and to provide a network interface between the processing system and a software defined network (SDN) controller;
responding, by the processing system, to the coordinator function with data regarding the plurality of drones;
after the responding, receiving, by the processing system, one or more commands to dispatch the plurality of drones to a coverage area corresponding to the access network; and
causing, by the processing system, the plurality of drones to travel to the coverage area to offload traffic for the access network.

15. The method of claim 14, wherein the data regarding the plurality of drones comprises location data for the plurality of drones, battery power status information for the plurality of drones, information regarding available capacity or bandwidth for the plurality of drones, information regarding current throughput associated with the plurality of drones, information regarding small cell types associated with the plurality of drones, capability data for the plurality of drones, or a combination thereof.

16. The method of claim 14, wherein the processing system comprises software-defined network (SDN) on drone (SOD) functionality, and wherein the processing system is included in a particular drone of the plurality of drones.

17. The method of claim 14, further comprising causing the plurality of drones to apply one or more encryption mechanisms when offloading traffic for the access network.

18. The device of claim 1, wherein the coordinator system operates within an edge computing device at an edge of the access network.

19. The non-transitory machine-readable medium of claim 10, wherein the DCCF operates within an edge computing device at an edge of the access network.

20. The method of claim 14, wherein the coordinator function operates within an edge computing device at an edge of the access network.

* * * * *